United States Patent
Köhne

[11] Patent Number: 5,882,456
[45] Date of Patent: Mar. 16, 1999

[54] METHOD OF MANUFACTURING A TIRE TREAD STRIP FOR A PNEUMATIC VEHICLE TIRE

[75] Inventor: Stephan Köhne, Aachen, Germany

[73] Assignee: Continental Aktiengesellschaft, Hanover, Germany

[21] Appl. No.: 850,628

[22] Filed: May 2, 1997

[30] Foreign Application Priority Data

May 2, 1996 [DE] Germany .................. 196 17 598.4

[51] Int. Cl.⁶ .................................................. B29O 30/52
[52] U.S. Cl. ............... 156/129; 156/244.11; 156/244.18; 156/244.23; 156/244.25; 156/406.4; 264/174.11; 264/175; 264/252
[58] Field of Search ............... 156/405.1, 406.4, 156/397, 123, 128.1, 128.6, 129, 244.18, 244.23, 244.25, 244.27, 554, 244.11; 264/174.11, 177.17, 210.1, 252, 326, 175

[56] References Cited

U.S. PATENT DOCUMENTS

| | | | |
|---|---|---|---|
| 1,353,934 | 9/1920 | Morris | 156/554 |
| 2,382,177 | 8/1945 | Schanz | 264/174.11 |
| 2,437,873 | 3/1948 | Beward | 156/244.25 |
| 3,274,645 | 9/1966 | Chase | 425/170 |
| 4,927,482 | 5/1990 | Capelle | 156/244.27 |
| 5,030,079 | 7/1991 | Benzing, II | 264/175 |
| 5,513,560 | 5/1996 | Downing et al. | 100/35 |

FOREIGN PATENT DOCUMENTS

| | | |
|---|---|---|
| 0131122 | 1/1985 | European Pat. Off. . |
| 0658452 | 6/1995 | European Pat. Off. . |
| 842263 | 6/1952 | Germany ............ 156/397 |
| 3325017 | 1/1985 | Germany . |
| 3737676 | 1/1989 | Germany . |

*Primary Examiner*—Geoffrey L. Knable
*Attorney, Agent, or Firm*—Robert W. Becker & Associates

[57] ABSTRACT

A method for manufacturing a tread strip with shoulder cover strips for a pneumatic vehicle tire includes the step of continuously extruding a shoulder cover strip and calendering the shoulder cover strip to a desired thickness. The thus thickness-reduced cover strip is then applied to the tread strip. The shoulder cover strip is then cut to length in order to match a circumferential length of the tread strip for building a tire.

2 Claims, 1 Drawing Sheet

METHOD OF MANUFACTURING A TIRE TREAD STRIP FOR A PNEUMATIC VEHICLE TIRE

BACKGROUND OF THE INVENTION

The present invention relates to a method for manufacturing a tire tread strip for a pneumatic vehicle tire with additional shoulder cover strips of rubber material in the shoulder area.

Such methods are, for example, known from European Patent Application 0 131 122 and from German Patent 33 25 017. In both known methods a shoulder cover strip is embodied as a connecting strip between the sidewall and the tread strip. This cover strip is supposed to improve the bonding of the sidewall to the tread strip which are made of different rubber materials. The shoulder cover strip are extruded together with a tread strip on a multiple die extruder and are then connected to the tread strip. Since for improving the bonding of the sidewall to the tread strip material the shoulder cover strips require a relatively large contacting surface for producing a sufficient adhesive contact between the shoulder cover strip and the sidewall as well as between the shoulder cover strip and the tread strip, such shoulder cover strips are of a relatively large thickness and the shoulder cover strips and their bonding to the tread strip can be produced relatively reliably by joint extrusion.

Such thick shoulder cover strips, however, affect the driving properties of the tire. This must be taken into consideration for the construction and manufacture of the tire and must be continuously monitored.

The joint extrusion method for tread strips and shoulder cover strips provides for a good mixing of the shoulder cover strip material and also a heating within similar temperature ranges as for the commonly extruded tread strip. Due to the temperatures of the shoulder cover strip and the tread strip being matched to one another the well mixed material can be applied directly at the extruder in an automated fashion onto the tread strip.

For applications in which such thick shoulder cover strips are not required, it is desirable to use shoulder cover strips of a much reduced thickness in order to minimize the effect onto the performance of the tire, for example, rolling resistance and handling. Uniformly thin shoulder cover strips cannot be produced or produced only with considerable expenditures by the methods known from European Patent Application 0 131 122 or German Patent 33 25 017.

Die heads of an extruder for producing thin extrudates (die strips) are subject to increased soiling which may lead to increased production down time due to the increased cleaning requirements. The reliability of the quality of the thinly extruded strips is constantly at risk due to undiscovered remains within the thin gap of the die head. These remains can result in being intermixed during subseuently performed production processes and can also result in clogging of the die head so that only a partial formation of the shoulder cover strip will result.

Such thin shoulder strips are, for example, suitable for use in connection with tire tread strips of rubber mixtures containing silica in which for lowering the conductance resistance of the tread strip shoulder cover strips are used within the shoulder area which contain mainly carbon black as a filler. Despite the reduced electrical conductance of the silica tread strip, the shoulder cover strip that reduces the conductance resistance ensures conductance of electrostatic charge. For this purpose a very thin shoulder cover strip is sufficient. The thickness of the shoulder cover strip is only of minimal importance in regard to conductance. In order to not affect the performance and trueness properties of the tire, the shoulder cover strip must be embodied as thin as possible. Such a vehicle tire with silica contained in the tread strip and attached shoulder cover strips is, for example, known from European Patent Application 0 658 452.

It is also known to apply premanufactured cut-to-length shoulder cover strips by hand. A uniform thickness can, however, not be produced by manual application. An adaptation of the temperature and tackiness of the shoulder cover strip to the tread strip is possible only to a limited extent.

It is therefore an object of the present invention to provide a method for manufacturing a tread strip of a pneumatic vehicle tire with shoulder cover strips with which method even thin shoulder cover strips can be applied reliably with substantially uniform thickness in an automated process.

SUMMARY OF THE INVENTION

The inventive method for manufacturing a tread strip with shoulder cover strips for a pneumatic vehicle tire is primarily characterized by the following steps:

Continuously extruding a shoulder cover strip;

Calendering the shoulder cover strip to a desired thickness;

Applying the shoulder cover strip of a desired thickness onto a tread strip;

Cutting to length the shoulder cover strip to match a required circumferential length of the tread strip.

Preferably, the shoulder cover strip is continuously guided from the step of extruding to the step of calendaring and subsequently to the step of applying.

Advantageously, the method further comprises the steps of continuously extruding the tread strip simultaneously to the shoulder cover strip with a common extruder; separately guiding the tread strip and the shoulder cover strip on separate conveying paths, wherein the shoulder cover strip is conveyed to the calendering step; and guiding the shoulder cover strip, after the step of calendering, to the tread strip.

Accordingly, the shoulder cover strip material is extruded as a strip material so that it is well intermixed and is substantially in the desired shape. In a subsequent step, the well-mixed and thus pre-shaped material is then reduced to the finished thickness within a calender arrangement. The calendering step allows for a reliably uniform thin embodiment of the material strip. The thickness and the course of the thickness during calendering can be adjusted very precisely. The thus finished thin shoulder cover strip is then applied onto the tread strip and cut to length so as to match the required circumferential length of the tire tread strip for building the tire. With this method the advantages of the extruder with respect to good mixing properties and shaping, the advantages of the calender with respect to especially precisely formed thin strip material as well as the direct matching of the length of the shoulder cover strip at the location of manufacture of the tread strip can be realized in an automated process. A complicated manual application of individually cut strips, which in prior art processes have been matched to a greater or lesser extent with respect to their thickness by manipulations such as, for example, stretching of the strip, can thus be avoided.

The invention allows the manufacture by only one machine without time loss. A retrofitting of the die head when changing to another desired thickness is not required. Since the adjusted thickness in the area before and after the calender is easily visible, a visual monitoring of the thickness of the shoulder cover strip and of the tread strip is easily possible and improved, in contrast to conventional multi-head extruders lacking such visual control, and the quality of the thickness of the tread strip and of the shoulder cover strip is increased.

The fine adjustment with the aid of the calender provides for a directed profiled thin course of the shoulder cover strip during the manufacturing process. The fine adjustment of the temperature as a function of the shrinkage behavior of the material allows an optimization of the shrinkage behavior and of the adhesive behavior (tackiness) of the shoulder cover strip relative to the adhesive behavior (tackiness) of the tread strip.

Especially advantageous is a continuous, uninterrupted process wherein the shoulder cover strip material, preheated within the extruder, is adjusted within the calender in an optimized manner to the temperature requirements for applying the shoulder cover strip to the tread strip. The shoulder cover strip can thus be applied directly in the finely adjusted state when coming from the calander onto the tread strip. The manufacture is thus achieved in a single continuous process. The shoulder cover strip may be protected by an additional support layer. An intermediate storage facility for storing premanufactured shoulder cover strips is no longer required when using the inventive method.

The method allows the simultaneous manufacture of tread strip and shoulder cover strip under similar manufacturing conditions in a common extruder (multi-head extruder) and the subsequent bonding under similar adhesive and temperature conditions even for shoulder cover strips having a uniformly thin cross-section.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
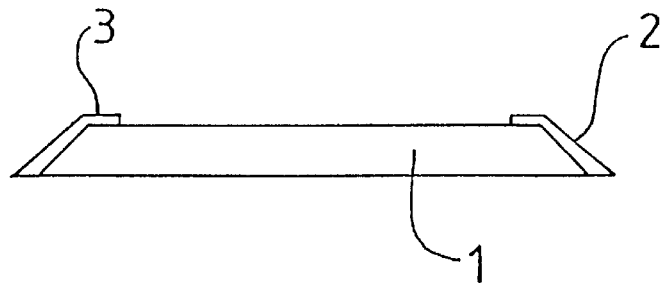
FIG. 1 shows a cross-sectional view of the inventive tread strip with applied shoulder cover strips.

The present invention will now be described in detail with the aid of a specific embodiment utilizing FIGS. 1 through 3.

Figure 2:
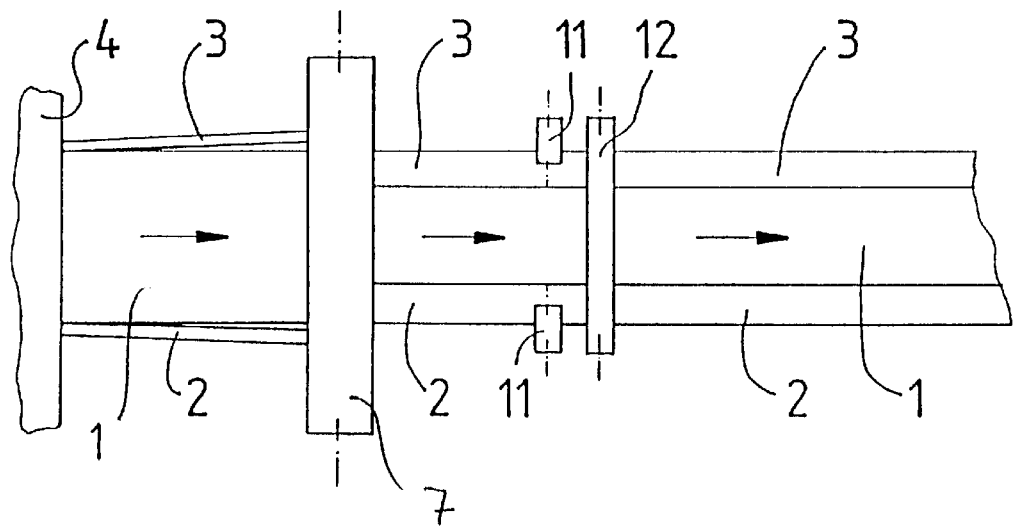
FIG. 2 shows in a schematic representation the manufacturing process in a view from above.
Figure 3:
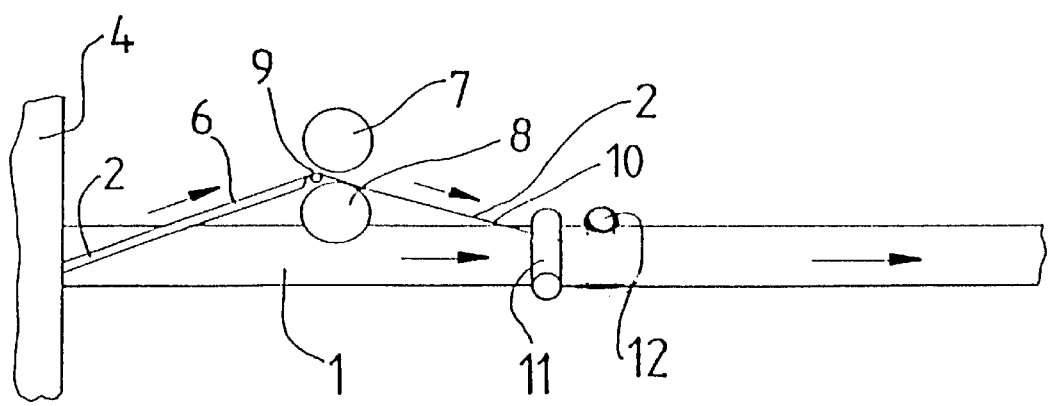
FIG. 3 shows the manufacture of FIG. 2 in a side view.

FIGS. 2 and 3 show in an exemplary manner schematically the inventive manufacture of a tread strip 1 with thin shoulder cover strips 2 and 3. The die heads (die strips) 4 of a multi-head extruder extrude a tread strip 1 and the two lateral shoulder cover strips 2 and 3. Within a first conveying area, the shoulder cover strips 2, 3 are continuously conveyed with a conveying device 6 of a known design to a calender with two calender rollers 7 and 8 of a known design. Between the calender rollers 7, 8 the shoulder cover strips 2, 3 are reduced in their thickness. Before the calender rollers 7, 8 a rolling bead 9 is formed in a known manner. The calendered thin shoulder strips 2, 3 are then conveyed into a second conveying area to a roller arrangement 11, 12 of a known design. With the aid of the rollers 11, 12 the calendered thin shoulder cover strips 2, 3 are directly applied by the pressing forces of the rollers 11, 12 onto the tread strip material 1 extruded by the die head 4. Downstream of the roller 12 the tread strip 1 with the applied shoulder cover strips 2, 3 is conveyed to a tire building drum of a known design. The tread strip 1 together with the shoulder cover strips 2, 3 is cut to length downstream of the roller 12 to the required circumferential length of the tire to be built or is supplied as a continuous strip to the tire building drum and is cut to length after application to the tire building drum.

It is possible to embody the conveying device 6, for example, as a conveying tube or conveying belt of a known design. For manufacturing shoulder cover strips for vehicle tires with tread strip mixtures containing silica, it is suggested to embody the shoulder cover strips of a rubber mixture that, in comparison to the tread strip mixture containing silica, has a substantially increased conductance, for example, a mixture containing a high amount of carbon black so that the electrical conductance resistance of the tread strip is reduced.

The calender rollers 7, 8 are embodied in a manner known per se such that a fine adjustment of the temperature as well as of the viscosity properties of the shoulder cover strip and of the adhesive properties (tackiness) is possible. For this purpose, the calenders, in a manner known per se, are provided with sensors and controlled heating and cooling devices. By changing the position of the calender rollers relative to one another, the desired thickness course of the shoulder cover strip can be adjusted very precisely to the individual specifications requirements.

The temperature of the shoulder cover strips in the calendar is, for example, 90° C. If the shoulder cover strip should exhibit a greater shrinkage value, the temperature is increased with the aid of the calender.

The shoulder cover strip has a thickness of<2 mm, for example, 0.5 mm, within the footprint area of the tire in order to ensure excellent performance properties. In the area of the shoulder bending portion, the thickness can be selected to be>2 mm. Such a thickness profile (cross-section) can be individually adjusted with the calender.

If necessary, it is possible to adjust the width of the shoulder cover strips, for example, with laterally arranged knives downstream of the calender. For example, the rollers 11 can be provided as guide rollers that are laterally adjustable in their position. Between the rollers 11 and 12, cutting knives can be arranged that are position-adjustable.

The present invention is, of course, in no way restricted to the specific disclosure of the specification and drawings, but also encompasses any modifications within the scope of the appended claims.

What I claim is:

1. A method for manufacturing a tread strip with shoulder cover strips for a pneumatic vehicle tire, said method comprising the steps of:

continuously extruding a shoulder cover strip;

continuously extruding a tread strip simultaneously with said shoulder cover strip by a common extruder;

separately guiding said tread strip and said shoulder cover strip on separate conveying paths;

calendering said shoulder cover strip to a desired thickness;

guiding said shoulder cover strip, after said step of calendering, to said tread strip;

applying said shoulder cover strip of the desired thickness onto said tread strip;

cutting to length said shoulder cover strip to match a required circumferential length of said tread strip.

2. A method according to claim 1, wherein said shoulder cover strip is continuously guided from said step of extruding to said step of calendering and subsequently to said step of applying.

\* \* \* \* \*